United States Patent [19]
Kelley

[11] Patent Number: 5,261,293
[45] Date of Patent: Nov. 16, 1993

[54] SPRING BIASED CONDUIT LENGTH ADJUST ASSEMBLY

[75] Inventor: Dixon L. Kelley, New Baltimore, Mich.

[73] Assignee: Teleflex Incorporated, Limerick, Pa.

[21] Appl. No.: 901,879

[22] Filed: Jun. 22, 1992

[51] Int. Cl.$^5$ .................................................. F16C 1/10
[52] U.S. Cl. ........................................ 74/502.6; 74/502.4
[58] Field of Search ............... 74/502.6, 502.4, 501.5 R

[56] References Cited

U.S. PATENT DOCUMENTS

| | | | |
|---|---|---|---|
| 3,435,165 | 3/1969 | Lombard | 74/501.5 R X |
| 4,464,950 | 8/1984 | Deligny | 74/501.5 R |
| 4,688,445 | 8/1987 | Spease et al. | 74/501.5 R |
| 4,833,937 | 5/1989 | Nagano | 74/502.6 X |
| 4,841,806 | 6/1989 | Spease | 74/502.6 X |
| 4,872,367 | 10/1989 | Spease | 74/502.6 |
| 5,142,933 | 9/1992 | Kelley | 74/501.5 R X |
| 5,144,856 | 9/1992 | Roca | 74/501.5 R |

FOREIGN PATENT DOCUMENTS

| | | | |
|---|---|---|---|
| 0397008 | 11/1990 | European Pat. Off. | 74/502.6 |
| 0106117 | 5/1987 | Japan | 74/502.6 |
| 0159408 | 6/1990 | Japan | 74/501.5 R |
| 956168 | 4/1964 | United Kingdom | 74/502.4 |

*Primary Examiner*—Rodney H. Bonck
*Attorney, Agent, or Firm*—Reising, Ethington, Barnard, Perry & Milton

[57] ABSTRACT

A motion transmitting remote control cable assembly (10) has a motion transmitting core element (12) slideably supported by first and second conduits (14,16), wherein the first conduit (14) telescopingly engages within the second conduit (16) between a fully inserted or "compressed" position and an extended position. The assembly also includes a spring (18) disposed within the second conduit (16) to interact between the first and second conduits (14,16). The assembly may include a locking mechanism (30) between the first and second conduits (14, 16) to maintain the two conduits in a predetermined relationship with respect to one another.

14 Claims, 2 Drawing Sheets

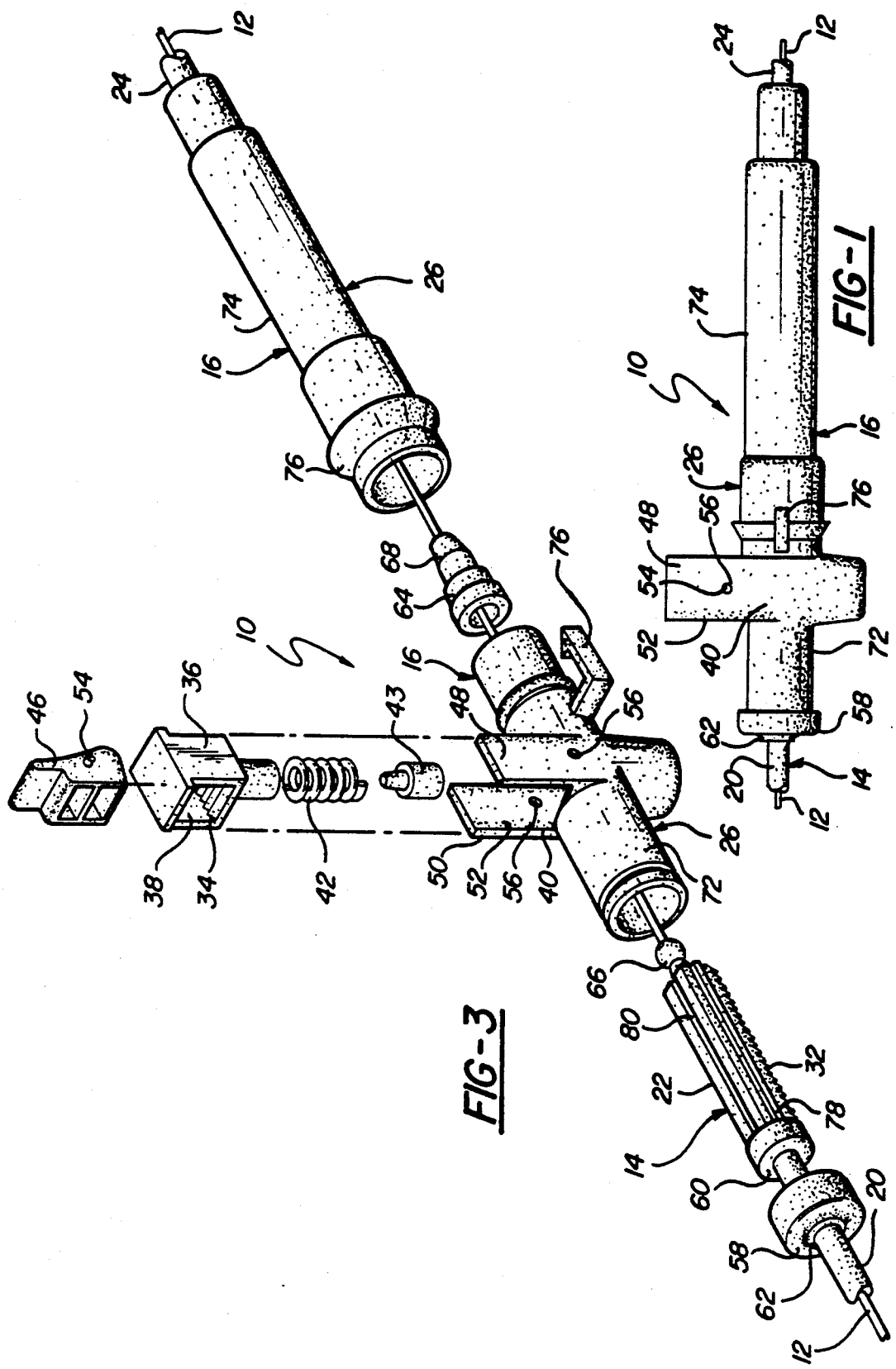

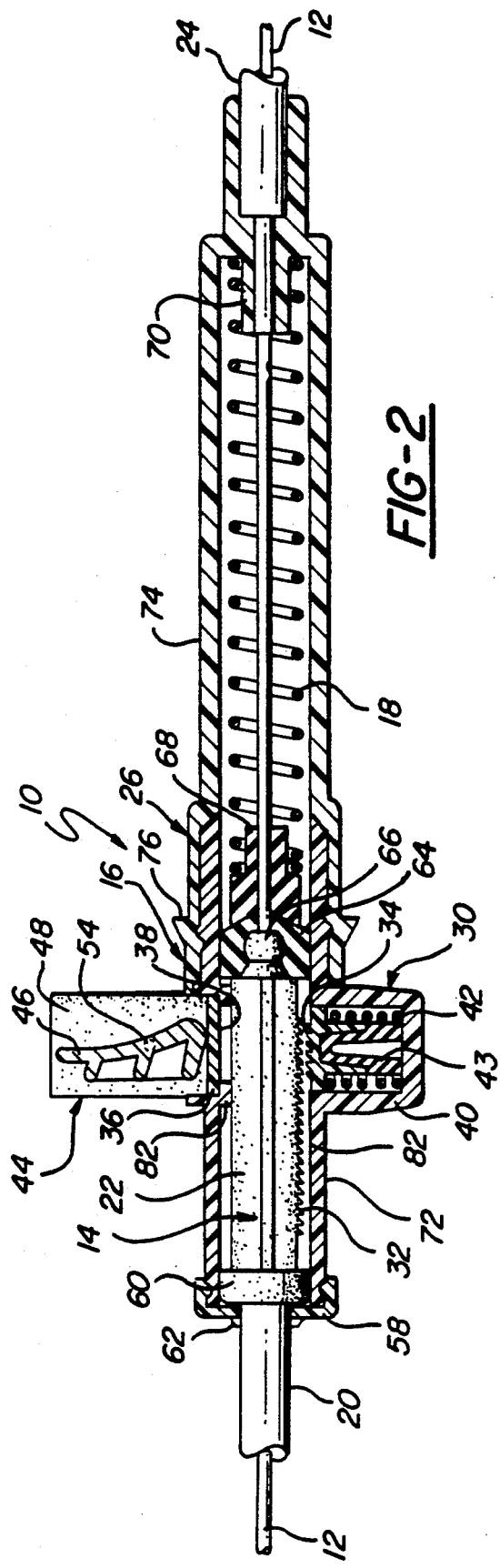
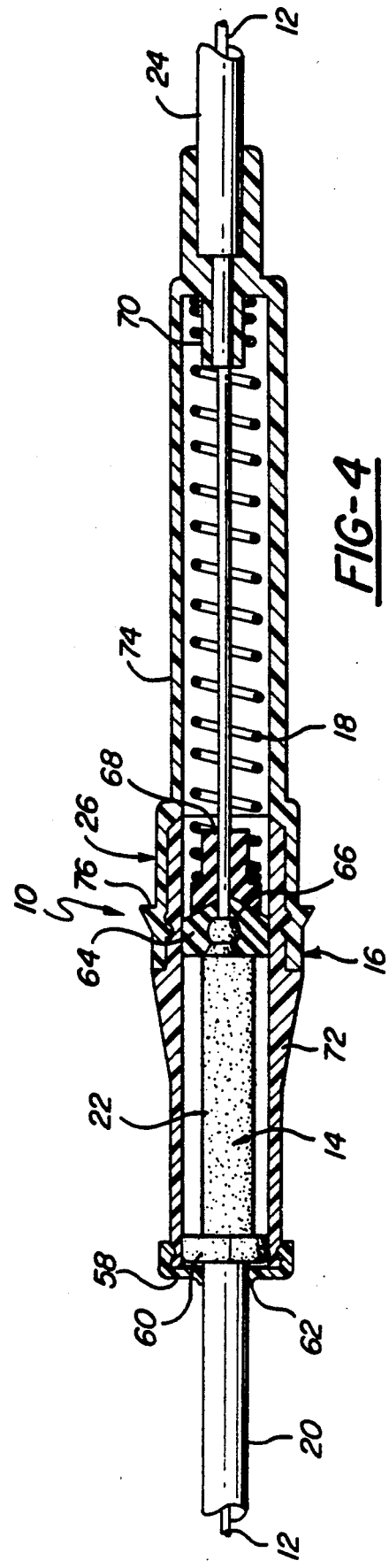

SPRING BIASED CONDUIT LENGTH ADJUST ASSEMBLY

TECHNICAL FIELD

The subject invention relates to motion transmitting remote control cable assemblies of the type for transmitting motion in a curved path, and more particularly to assemblies for joining two conduits which support a single motion transmitting core element.

BACKGROUND OF THE INVENTION

In the typical remote control assembly for controlling a throttle, such as in a vehicle, a push-pull cable interconnects the pedal and a throttle control lever. In these assemblies, there is a tendency for the force exerted through the cable from the pedal to deform the throttle control lever. This is because the pedal can transmit a large amount of force and the lever is usually only a thin piece of sheet metal. When this deformation of the lever occurs, the throttle control lever fails to translate the push-pull forces from the pedal to the throttle. As a result, the throttle will not respond fully to movement of the pedal, and the vehicle will not accelerate as quickly as it did before the throttle lever was bent. This can be dangerous for a driver, who expects that her vehicle will accelerate faster than it actually will.

What is needed is an overload absorbing mechanism in the cable which will absorb forces above a predetermined level, and not transmit forces above this level to the throttle lever.

SUMMARY OF THE INVENTION

A motion transmitting remote control cable assembly of the type for transmitting motion in a curved path comprises a motion transmitting remote control core element, first conduit means for slideably supporting the core element and second conduit means for slideably supporting the core element. The first conduit means is moveably supported within the second conduit means for rectilinear movement between an extended position and a compressed position in which the first conduit means is relatively more deeply disposed within the second conduit means than in the extended position. The assembly is characterized by biasing means housed within the second conduit means for reacting between the first and second conduit means to urge same toward the extended position.

Thus, this cable assembly can be used to interconnect a pedal and a throttle control lever, and there will be no danger of the lever being bent by the cable. This is because if a force above a predetermined level is applied to the cable from the pedal, the cable will absorb the force and not translate the force to the lever. At a given force level, the first conduit will be forced into telescoping engagement within the second conduit, shortening the effective length of conduit supporting the core element (where the conduit comprises the first and second conduits acting together). This will in effect render the core element relatively longer than it earlier was, and this decreases the force which it delivers to the lever.

FIGURES IN THE DRAWINGS

Other advantages of the present invention will be readily appreciated as the same becomes better understood by reference to the following detailed description when considered in connection with the accompanying drawings wherein:

FIG. 1 is a side view of the subject invention including the locking means;

FIG. 2 is a cross sectional view with the lever depressing the floating member and thereby disengaging the locking teeth;

FIG. 3 is an exploded perspective view of the subject invention including the locking means; and FIG. 4 is a side cross sectional view of another embodiment of the subject invention without the locking means.

DETAILED DESCRIPTION OF THE PREFERRED EMBODIMENT

A motion transmitting remote control cable assembly generally shown at 10 of the type for transmitting motion in a curved path comprises a motion transmitting remote control core element 12, first conduit means generally indicated at 14 for slideably supporting the core element and second conduit means generally indicated at 16 for slideably supporting the core element. The first conduit means 14 is moveably supported partly within the second conduit means 16 for rectilinear movement between an extended position and a compressed position in which the first conduit means 14 is relatively more deeply disposed within the second conduit means than in the extended position. The assembly 10 is characterized by biasing means 18 housed within the second conduit means 16 for reacting between the first and second conduit means 14,16 to urge same toward the extended position.

The first conduit means 14 includes a first conduit 20 and a male end fitting 22 disposed at one end of the first conduit.

The second conduit means 16 includes a second conduit 24 and a female end fitting generally indicated at 26 disposed at one end of the second conduit for telescopingly receiving the male end fitting 22.

The male end fitting 22 is the part of the first conduit means 14 which engages within the second conduit means 16, and the female end fitting 26 is the part of the second conduit means in which the male end fitting engages.

The biasing means 18 includes a helical spring 18 which is formed so that its neutral position is extended rather than compressed. In this way, the spring 18 will bias outward toward an extended position once it is compressed with a compressive force.

With these basic elements, the subject invention may be used as a dynamic overload or shock absorbing device between the first and second conduits 20,24. When an axial force along the conduits 20,24 forces them together, the first conduit 20 may move more deeply within the second conduit 24 to a compressed position subject to the biasing force of the spring 18. The spring 18 will thus absorb the axial force and then bias the two conduits 20,24 apart to an extended position.

As shown in FIGS. 1-3, the assembly 10 may include locking means generally indicated at 30 for locking the male end fitting 22 at a predetermined position within the female end fitting 26 to maintain a predetermined relationship between the first conduit 20 and the second conduit 24. This embodiment serves a different purpose from the first embodiment: it does not provide a shock absorbing function anymore. In this embodiment, the two conduits 20,24 can be installed and allowed to reach an equilibrium state with respect to each other and the spring 18. Once this state is reached the two conduits 20,24 may be locked with respect to each other. The spring 18 then becomes unneccesary until the conduits are unlocked again. The spring 18 merely serves as a "third hand" (or foot) for the installer. In other words, it maintains the conduits at a desired relationship while the installer manipulates the pedal with one hand (or foot) and locks the conduits together with the other hand (or foot).

The locking means 30 includes a first set of locking teeth 32 disposed on the male end fitting 22 and a second set of locking teeth 34 disposed within the female end fitting 26 biased into engagement with the first set of locking teeth. The second set of locking teeth 34 is disposed on a floating member 36 which is disposed within the female end fitting 26 and capable of movement with respect to the female end fitting. The floating member 36 has a top, an oppositely disposed bottom, a first side and an oppositely disposed second side, all of which together define a passageway 38 through the floating member 36. The floating member 36 can be aligned within the female end fitting 26 so that the passageway 38 through the floating member 36 is generally coaxial with the passageway through the female end fitting. In this way the male end fitting 22 is slideably disposed in the floating member passageway 38 as it is supported in the female end fitting 26. The passageway 38 defined by the floating member 36 must be slightly taller than the male end fitting 22. This is because the second set of locking teeth 34 is disposed on the bottom of the floating member 36 and extends into the floating member passageway 38. The floating member passageway 38 must be tall enough so that the floating member 36 can be pushed toward the male end fitting 22 to release the two sets of locking teeth 32,34.

The female end fitting 26 includes support means 40 for slideably supporting the floating member 36. The support means 40 includes a conduit 40 extending perpendicularly to the direction of the rectilinear movement of the male member for slideably supporting the floating member 36. The conduit 40 is a tube which is formed as a part of the female end fitting 26, which basically forms a "t" with the part of the female end fitting which supports the male end fitting 22. In other words, one part of the conduit 40 extends below the male end fitting 22 and one part extends above the male end fitting.

A spring 42 is disposed within the support means or conduit 40 in the part of the conduit extending below the passageway supporting the male end fitting 22 for biasing the second set of locking teeth 34 on the floating member 36 into engagement with the first set of locking teeth 32 on the male end fitting. A spring seat 43 is disposed within the conduit 40 between the conduit 40 and the spring 42 to locate the spring in the desired position within the conduit 40.

The female end fitting 26 includes disengaging means generally indicated at 44 for applying a force to the floating member 36 to overcome the biasing force of the spring 42 to disengage the first and second sets of locking teeth 32,34 whereby a new positioning of the male end fitting 22 within the female end fitting 26 may be selected. The disengaging means 44 includes a lever 46 attached to the support means 40 and is moveable between a first position in which the lever coacts between the support means 40 and the floating member 36 to disengage the second set of locking teeth 34 from the first set of locking teeth 32, and a second position in which the lever 46 is disposed free from interaction with the floating member 36 to permit the spring 42 to bias the second set of locking teeth 34 into engagement with the first set of locking teeth 32. The lever 46 is attached specifically to the part of the conduit 40 which extends above the part of the female end fitting 26 where the male end fitting 22 is supported. This part of the conduit 40 includes a first ear 48 and a second ear 50. These ears 48,50 are spaced apart from each other to define oppositely disposed notches 52 in the conduit 40. The lever 46 is pivotally mounted to these ears 48,50. The lever includes a pin 54 extending from each side of the lever to define the axis about which the lever pivots. These pins 5 fit into corresponding holes 56 in the ears 48,50 of the conduit 40. As shown in FIGS. 2 and 3, when the lever 46 is in the "up" position, the lever will depress the floating member 36 and thereby disengage the sets of locking teeth 32,34 to enable the male end fitting 22 to slide freely within the female end fitting 26. When the lever 46 is flipped into the "down" position, it does not engage the floating member 36, and the floating member is biased upwardly through the conduit 40 by the spring 42. In this manner, the sets of locking teeth 32,34 will engage one another and the male and female end fittings 22,26 will be locked to prevent any relative movement therebetween. In the preferred embodiment the locking teeth 32,34 are slanted to provide for one-way ratcheting action of the male end fitting 22 into deeper engagement within the female end fitting 26; i.e. to allow the two conduits 20,24 to move into a compressed relationship with respect to one another.

The assembly 10 also includes retaining means 58 for retaining the male end fitting 22 within the female end fitting 26. The male end fitting 22 extends radially beyond the first conduit 20 to define a radial flange 60. In other words, the male end fitting 22 has a larger cross section area than the first conduit 20. The retaining means 58 includes a cap 58 disposed on the distal or most remote end of the female end fitting 26 extending radially inward to provide an abutting surface to abut the radial flange 60 defined by the male end fitting 22. In other words, the retaining cap is disposed on the end of the female end fitting 26 most remote from the second conduit 24. The retaining cap 58 snaps or otherwise fastens onto this distal end in any appropriate manner. In the preferred embodiment, the cap snaps onto the distal end by means of a annular groove and ridge force fit or "snap-fit" connection. The cap 58 is circular in shape and defines a circular hole 62 at its center for allowing the first conduit 20 to pass through. The hole 62 is not large enough to allow the male end fitting 22 to pass through, and so when the cap 58 is attached to the female end fitting 26, the male end fitting will be retained within the female end fitting. The spring 18 biases the male end fitting 24 into abutting relationship with this cap 58.

The male end fitting 22 includes a wiper cap 64 disposed on the end of the male end fitting remote from the first conduit 20 for preventing liquid and solid contaminants or debris from passing between the male and female end fittings 22,26. The male end fitting 22 includes a locator 66 disposed on its end remote from the first conduit 20 for locating the wiper cap 64 and retaining the wiper cap in a predetermined position with respect to the male end fitting 22.

The assembly 10 includes a spring seat 68 disposed on or adjacent to the wiper cap 64 for supporting one end of the spring 18. The assembly 10 also includes a spring seat 70 disposed within the female end fitting 26 adjacent the second conduit 24 for supporting the other end of the spring 18. These spring seats 68,70 serve to maintain the the spring 18 in a desired position concentrically around the core element 12.

The female end fitting 26 includes first and second interconnecting sections 72,74. This facilitates the installation of the assembly 10. The two sections 72,74 of the female end fitting 26 may be joined together in a number of ways, including using "crab claw" connectors (shown at 76 in FIGS. 1 and 3), annular ridge and groove force fit connectors (commonly referred to as "snap-fit connectors") or any other appropriate connectors.

It will be appreciated that the core element 12 extends through the first conduit 20, the male end fitting 22, the wiper cap, the spring seat on the male end fitting, the spring 18, the spring seat on the female end fitting 26, the female end fitting 26 and the second conduit 24.

In the embodiment including the locking means 30, it is preferred that the male end fitting 22 is molded or otherwise formed to include guide ridges 78 and channels 80 to interact with corresponding ridges and channels 82 in the first section of the female member 26, i.e. the section having the conduit 40. In this manner, the male end fitting 22 will slide in a type of guide track within the first section of the female end fitting 26. This guide track is important in the embodiment having the locking means 30 because it prevents the male end fitting 22 from moving up and down (i.e. radially) within the female end fitting 26. In other words, the track allows the male end fitting 22 to move only back and forth in the female end fitting 26; and not up and down. This ensures that the sets of locking teeth 32,34 will be firmly engaged when the second set of locking teeth 34 is biased upwardly toward the first set of locking teeth 32. If the male end fitting 22 could move up and down in the female end fitting 26 the sets of locking teeth 32,34 may become disengaged and the male end fitting will slip out of its desired position within the female end fitting.

The invention has been described in an illustrative manner, and it is to be understood that the terminology which has been used is intended to be in the nature of words of description rather than of limitation.

Obviously, many modifications and variations of the present invention are possible in light of the above teachings. It is therefore to be understood that within the scope of the appended claims wherein reference numerals are merely for convenience and are not to be in any way limiting, the invention may be practiced otherwise than as specifically described.

We claim:

1. A motion transmitting remote control cable assembly (10) of the type for transmitting motion in a curved path comprising:

a motion transmitting remote control core element (12);

first conduit means (14) for slidably supporting said core element including a first conduit (20) and a male end fitting (22) disposed at one end of said first conduit;

second conduit means (16) for slidably supporting said core element including a second conduit (24) and a female end fitting (26) disposed at one end of said second conduit for telescopingly receiving said male end fitting and for supporting said male end fitting and said core element;

said first conduit means (14) being movably supported within said second conduit means (16) for rectilinear movement between an extended position and a compressed position in which said first conduit means is relatively more deeply disposed within said second conduit means than in extended position;

biasing means (18) housed within said female end fitting (26) for reacting between said male and female end fittings (24,26) to urge same toward said extended position;

characterized by said female end fitting (26) including separate first and second interconnecting sections (72,74), said first and second sections being joined in telescoping relation to define an overlap, said first section including a first distal end extending away from said overlap with said second section, said second section including a second distal end extending away from said overlap with said first section.

2. An assembly (10) as set forth in claim 1 further characterized by including locking means (30) for locking said male end fitting (22) at a predetermined position within said female end fitting (26) to maintain a predetermined relationship between said male end fitting and said female end fitting.

3. An assembly (10) as set forth in claim 2 further characterized in said locking means (30) including a first set of locking teeth (32) disposed on said male end fitting (22) and a second set of locking teeth (34) disposed within said female end fitting (26) biased into engagement with said first set of locking teeth.

4. An assembly (10) as set forth in claim 3 further characterized by including a floating member (36) disposed within said female end fitting (26) capable of movement with respect to said female end fitting, said second set of locking teeth (34) being disposed on said floating member (36).

5. An assembly (10) as set forth in claim 4 further characterized by said female end fitting (26) including support means (40) for slideably supporting said floating member (36).

6. An assembly (10) as set forth in claim 5 further characterized by including a spring (42) disposed within said support means (40) for biasing said second set of locking teeth (34) on said floating member (36) into engagement with said first set of locking teeth (32) on said male end fitting (22).

7. An assembly (10) as set forth in claim 6 further characterized by said female end fitting (26) including disengaging means (44) for applying a force to said floating member (36) to overcome the biasing force of said spring to disengage said first and said second sets of locking teeth (32,34) whereby a new positioning of said male end fitting (22) within said female end fitting may be selected.

8. An assembly (10) as set forth in claim 1 further characterized by including retaining means (58) for retaining said male end fitting (22) within said female end fitting (26).

9. An assembly (10) as set forth in claim 8 further characterized by said male end fitting (22) extending radially beyond said first conduit (20) to define a radial flange (60).

10. An assembly (10) as set forth in claim 9 further characterized by said retaining means (58) including a cap (58) disposed on the distal end of said female end fitting (26) extending radially inward to provide an abutting surface to abut said radial flange (60) defined by said male end fitting (22).

11. An assembly (10) as set forth in claim 1 further characterized by said biasing means (18) including a helical spring (18).

12. An assembly (10) as set forth in claim 11 further characterized by said male end fitting (22) including a wiper cap (64) disposed on the end of said male end fitting remote from said first conduit (20) for preventing contaminants from passing between said male and female end fittings (22,26).

13. An assembly (10) as set forth in claim 12 further characterized by including a spring seat (68) disposed on said wiper cap (64) for supporting one end of said spring (18).

14. An assembly (10) as set forth in claim 13 characterized by including a spring seat (70) disposed within said female end fitting (26) adjacent said second conduit (24) for supporting one end of said spring (18).

* * * * *